May 24, 1955

J. SCHULTZ 2,708,874

DAMPENING MECHANISM FOR LITHOGRAPHIC
OFFSET PRESSES AND THE LIKE

Filed May 9, 1951

INVENTOR.
JOSEPH SCHULTZ
BY
George W. Boxwell
ATTORNEY

J. SCHULTZ 2,708,874

DAMPENING MECHANISM FOR LITHOGRAPHIC
OFFSET PRESSES AND THE LIKE

Filed May 9, 1951

INVENTOR.
JOSEPH SCHULTZ
BY George W. Baywell
ATTORNEY

INVENTOR.
JOSEPH SCHULTZ
BY George W. Saywell
ATTORNEY

United States Patent Office 2,708,874
Patented May 24, 1955

2,708,874

DAMPENING MECHANISM FOR LITHOGRAPHIC OFFSET PRESSES AND THE LIKE

Joseph Schultz, Shaker Heights, Ohio

Application May 9, 1951, Serial No. 225,368

21 Claims. (Cl. 101—148)

The invention relates to dampening mechanism, and particularly to mechanism of this character for supplying moisture to lithographic, printing, and other reproducing and typographical apparatus. The invention will herein be described and illustrated in the accompanying drawings as used for dampening the plate cylinder of a lithographic offset press. The moistening medium is water, or a dilute solution of gum arabic or other materials or combination of materials in water. The terms "water," "moisture," and "liquid" are herein interchangeably used to designate the dampening medium.

Among the objects of the invention herein described, illustrated and claimed, some important ones are, (a) Efficiently to supply the dampening medium to the plate cylinder of a lithographic offset press in edge-merging annular zones;

(b) Provision of improved mechanism for regulating and maintaining the flow of dampening medium to the several parts of the plate;

(c) To provide segregated water treatment for different parts of the plate according to their several requirements, such as required for different sizes and designs, border or lateral areas, solid ink impressions, half-tone impression, etc.;

(d) Provision of such dampening means wherein the supplying of moisture to the several parts of the plate is automatically controlled by the weight of the moisture on pivoted molleton-covered wheels or spools forming part of the mechanism which transfers the moisture from the water pan to the plate;

(e) Provision of a liquid-supply wheel which takes up liquid on its surface until enough is taken up to counterbalance an opposite weight;

(f) Determining the proper amount of liquid to be taken up and distributed by a scale principle;

(g) Provision of means providing a fine overall control of the pivotal automatic dampening mechanism, particularly applicable according to the character of the paper upon which the printing by the press is being effected; and (h) Provision of a flexible flat spring locking device that will periodically temporarily hold the pivotal wheel in either moisture pick-up or moisture-dispensing position.

Some sub-combinations of the improved dampening mechanism are also herein shown and described among which are the following:

($a^1$) Provision of an improved dampening roller structure of pneumatic type;

($b^1$) Provision of a flexible air-inflated roller, soft enough so that when contacting the plate on the plate cylinder it will not wear off the fine grain of the plate. This flexible air-inflated roller, which is the dampening roller, is also so soft that it will not wear off the fine half-tone dots on the plate. This inflated dampening roller is soft enough to pass over the solid ink without the ink being squeezed into the pores of the molleton covering. This is an essential distinction over standard dampening devices used on present day presses wherein the rollers have a semi-hard surface and consequently the ink gets pounded into the pores of the molleton covering necessitating frequent washing and changing of the covering. This soft dampening roller is so flexible that it needs no setting, but adapts itself when contacting the plate and the brass roller which feeds the moisture to this dampening roller. This dampening roller can be deflated and a new molleton cover applied thereto and then the roller again inflated. This is an expedient which represents a considerable saving in labor and also a minimum of trouble; and ($c^1$) Provision of an assembly of dampening elements whose adjustments are conveniently effected by improved actuating mechanism, together with supplemental means providing for removal from the press of certain units to permit convenient replacement, adjustment, lubrication, and other necessary repair and servicing operations, such as cleaning out paper jams from the gripper and guide mechanism.

The claims of the instant application are limited to the improvements in a moisture ductor or metering mechanism for lithographic presses.

The annexed drawings and the following description set forth in detail certain means illustrating the improvements in dampening mechanisms for lithographic offset presses and the like, such drawings and description showing, and setting forth, respectively, however, only a few of the various forms in which the principle of the invention may be embodied.

In said annexed drawings:

Figure 8 is a fragmentary section, similar to a portion of Figure 4, but on an enlarged scale, particularly showing a fine adjustment which regulates the moment of the weight of water taken up by the pivoted water-transfer wheel, the full line position of a certain moment-regulating roller being that in which the roller dictates the actuation of the pivotally-mounted transfer wheel into water-supplying position, when a less than normal amount of water is required, and the dotted positions of this control roller indicating, respectively, the positions thereof when a normal amount of water effects the movement into water-supplying position of the transfer wheel, and when more water than normal is required to effect the movement of the water-supplying wheel into water-transfer position, it being understood that by "normal amount of water" is meant the amount dictated by the main setting of the counterweight to the wheel, which main setting by the counterweight is shown in Figures 3, 4, and 5. This fine adjustment is particularly advantageous when the desirable amount of moisture is determinable from the character of the paper upon which the printing by the press is being effected, soft papers requiring more water and ink, and coated or hard papers requiring less water and ink;

Figure 1:
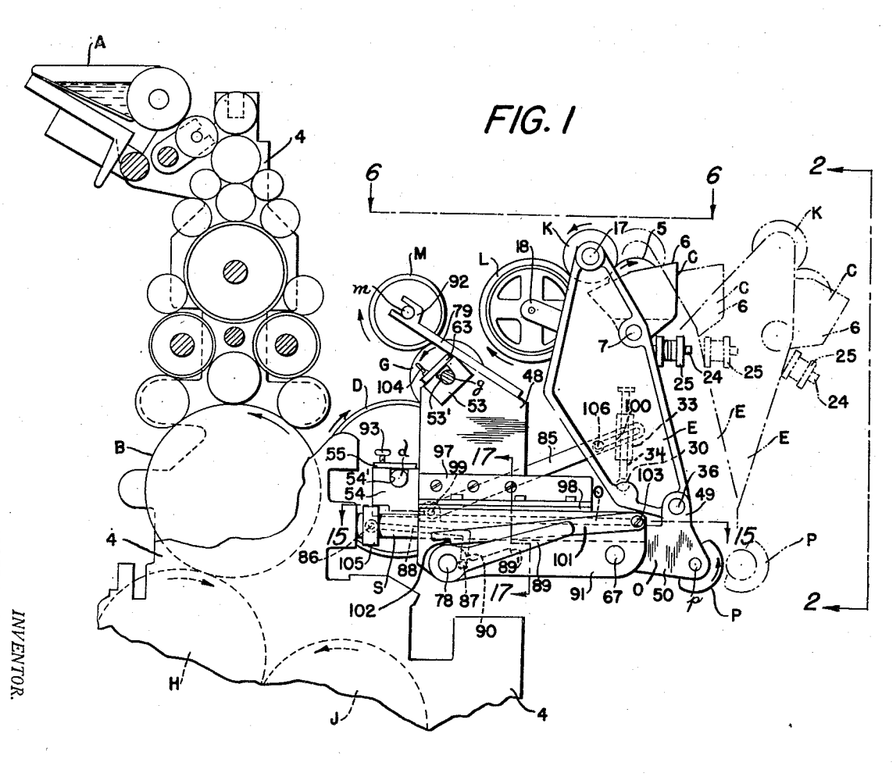
Figure 1 is a fragmentary longitudinal elevation of the operator's side of a lithographic offset press in which my improvements in dampening mechanism are incorporated.

Referring to the annexed drawings in which the several elements are designated by the same respective characters in the different views, so much of a lithographic offset press 4 is shown as is required to indicate the position therein of the improvements in dampening mechanism herein presented, together with the structure and operation of the several elements of the improvements. Figure 1 discloses an ink fountain A together with a standard arrangement of rollers for feeding ink therefrom to the cylinder B carrying the plate b; also, a moisture fountain C and rollers and other elements feeding moisture therefrom to the plate cylinder B. The invention herein presented relates particularly to improved elements for thus supplying moisture to an improved pneumatic dampening roller D from which the moisture is conveyed to the plate b of the plate cylinder B by rolling contact therewith.

Figure 2:
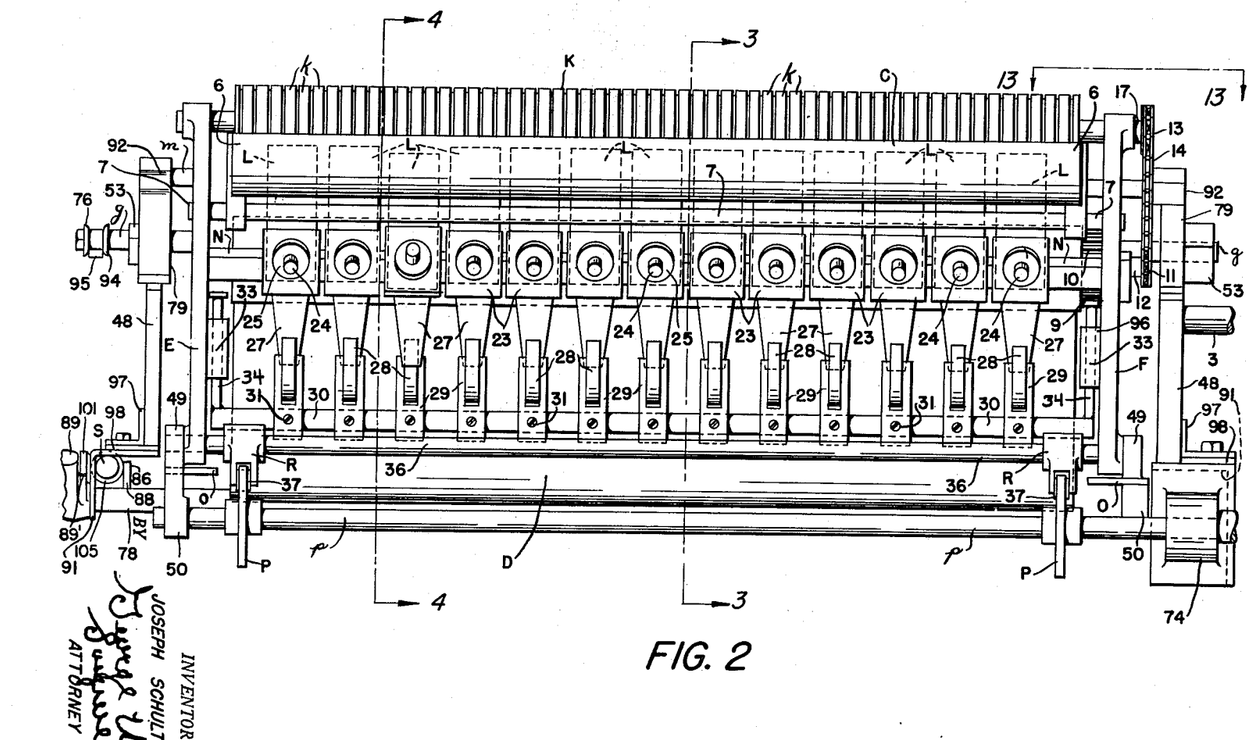
Figure 2 is a fragmentary transverse elevation, upon a somewhat enlarged scale, taken from the feed end of the press, the plane from which the elevation is taken being indicated by the line 2—2, Figure 1.
Figure 13:
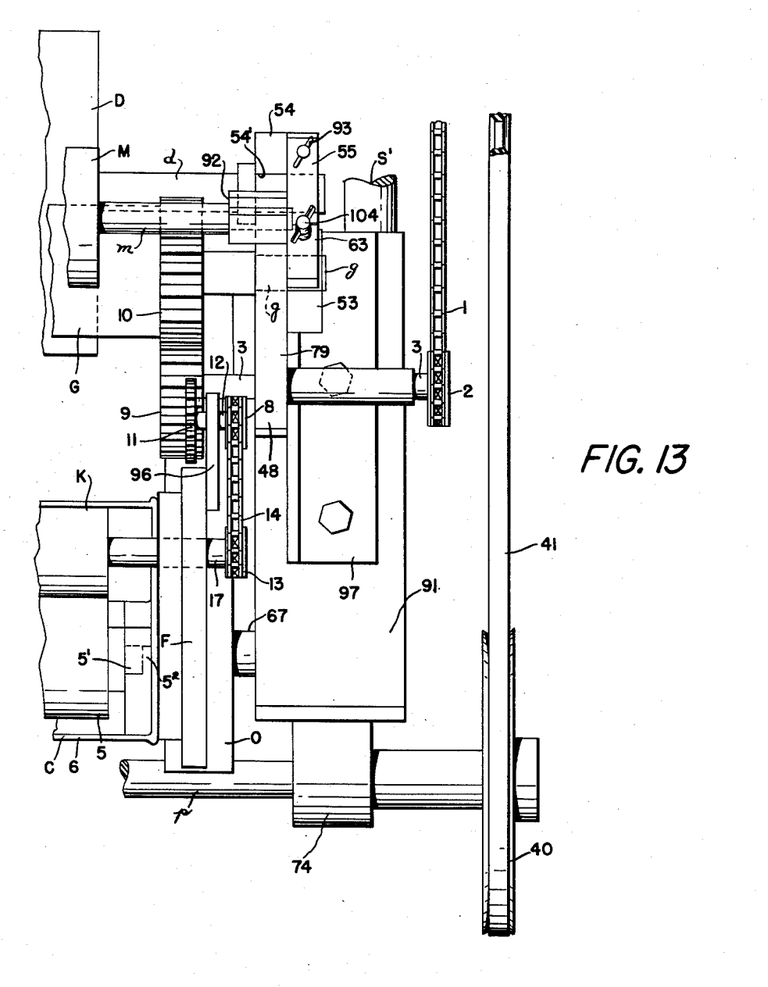
Figure 13 is a fragmentary longitudinal plan view, upon an enlarged scale, of the driving side of the press, the view being taken from the plane indicated by the line 13—13, Figure 2.
Figure 14:
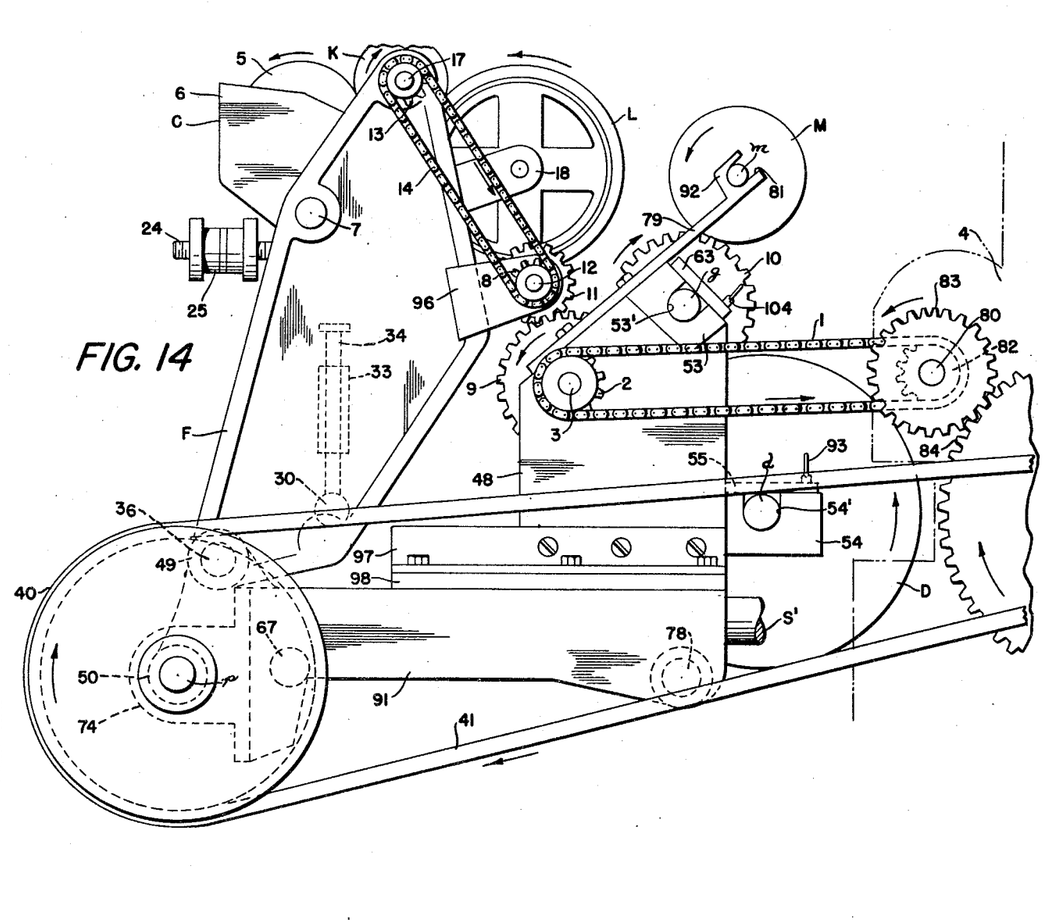
Figure 14 is a fragmentary longitudinal elevation, upon an enlarged scale, of the driving side of the press.

In Figures 2, 13, and 14, are shown so much of the press driving elements as enable the relation thereof, to the operation of the improvements herein presented, to be understood.

A pivotally-mounted frame member E forming part of shiftable mechanism on the operator's side of the press and a corresponding pivotally-mounted frame member F on the driving side of the press are shown in Figures 1, 2, 6, 13, 14, and 16.

Figure 3:
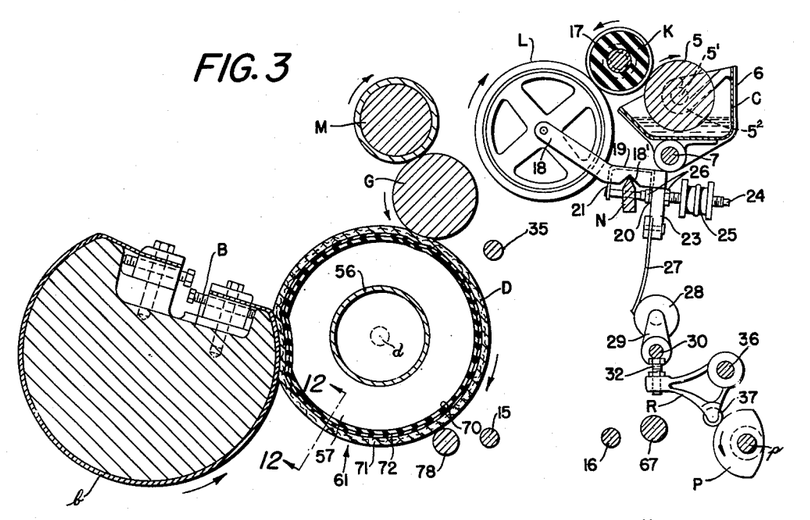
Figure 3 is a longitudinal vertical section, taken in the plane indicated by the line 3—3, Figure 2, the view looking toward the driving side of the press, and particularly showing an improved rotatable and pivotally-mounted molleton-covered moisture-transfer wheel or spool, forming part of the invention, in position wherein it is taking on water from the water feed roller, the view also showing a dampening roller of improved construction, and an auxiliary water diffusion or water reservoir roller riding upon a brass roller which is in direct rolling contact with the improved dampening roller.
Figure 4:
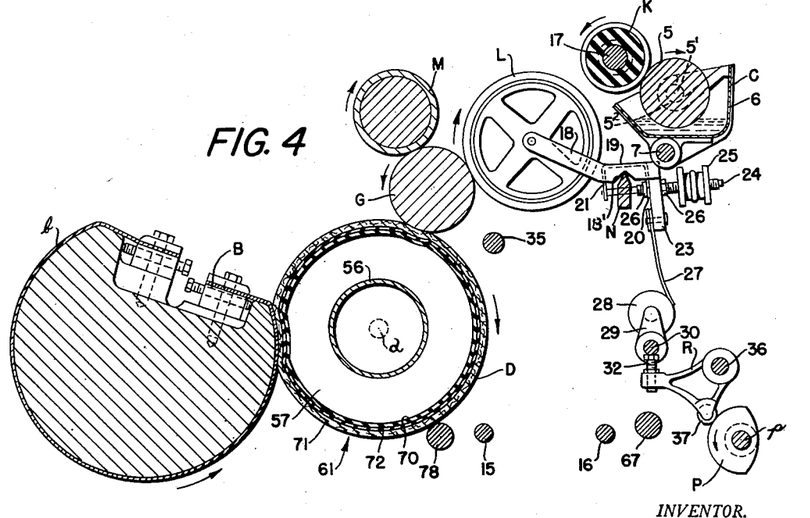
Figure 4 is a vertical section, taken in the plane indicated by the line 4—4, Figure 2, the view being similar to Figure 3, except that the rotatable and pivotally-mounted water-transfer wheel herein shown is in the position in which it is supplying water to a driven brass roller having rolling engagement with the improved dampening roller, which dampening roller transfers the water to the plate, the brass roller having also rolling engagement with the molleton-covered moisture-diffusing roller riding on the brass roller and serving as a water reservoir.
Figure 5:
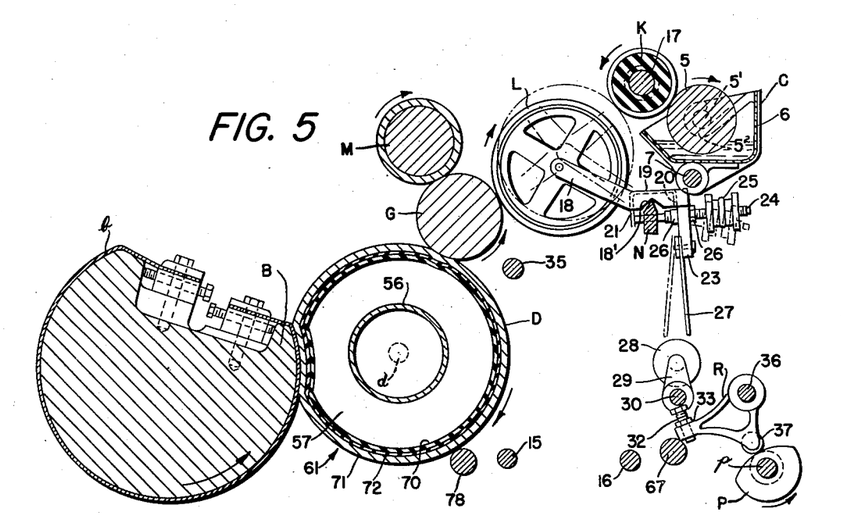
Figure 5 is a vertical section, similar to Figures 3 and 4, in which the pivotally-mounted water-transfer wheel is shown as being left free to swing on its pivot according to the moment of the water which it carries, i. e., it can swing either for engagement with the water feed roller for taking on water from the water pan, or into engagement with the brass roller for supplying water toward the plate, depending upon the weight of water which this transfer wheel is carrying, the actual condition shown in Figure 5 being one in which the water weight of the transfer wheel is sufficient to swing it on its pivot to a position to supply water to the brass roller.

Lower tie rods 15 and 16, Figures 3, 4, and 5, are provided which are secured at their ends in angle elements 91 hereinafter fully described; as also, an upper tie rod 35 secured at its ends to opposed upright brackets 48, also hereinafter fully described.

Certain improved elements for manually shifting the entire dampening mechanism into a certain inoperative position most clearly appear in Figures 1, 2, 6, 15, 16, and 17.

Means whereby a moisture pan 6, pivotally-mounted moisture-transfer wheels L, and certain related elements, can be manually pivotally shifted into a final inoperative position are particularly shown in Figures 1, 2, 3, 4, 5, 14, and 16.

Figure 7:
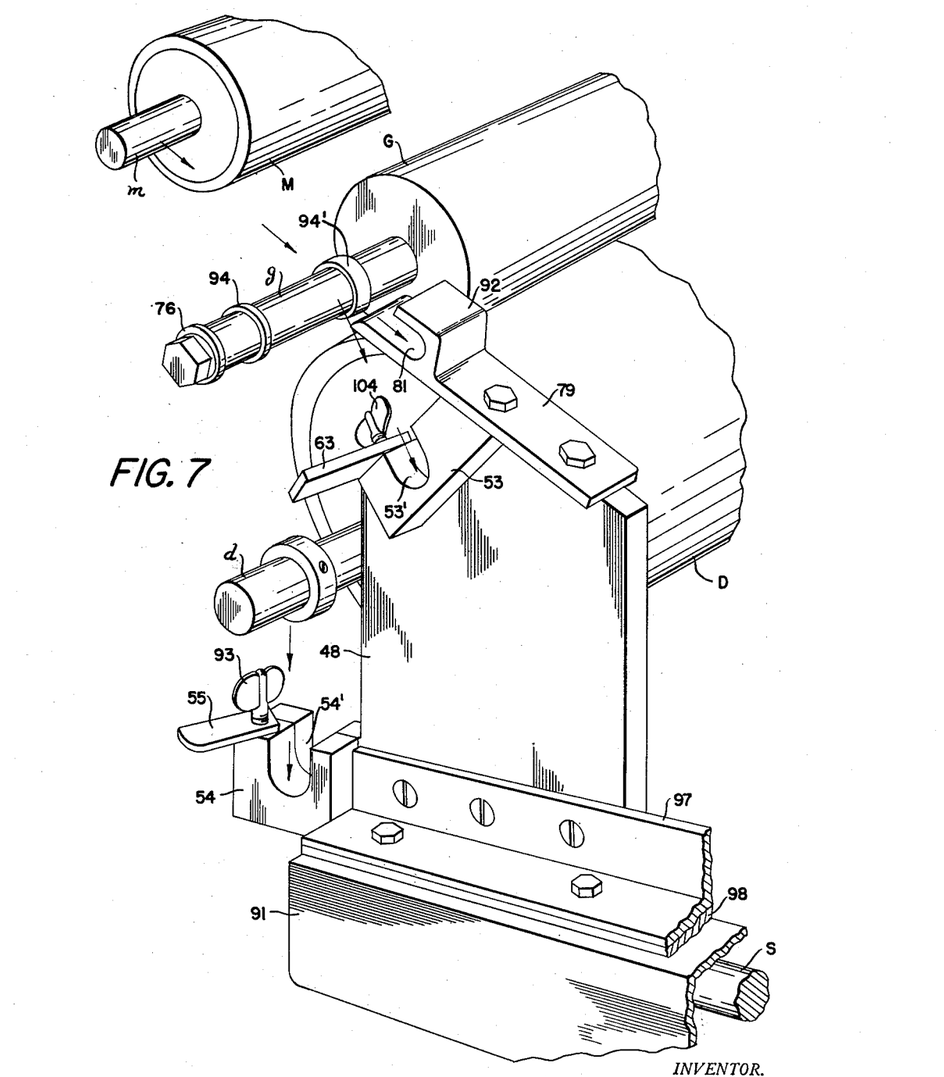
Figure 7 is a fragmentary perspective, upon an enlarged scale, and in dismounted positions, of some of the elements of the pivotally mounted moistening mechanism, including the water reservoir roller, the brass roller, and the improved dampening roller, which, when the press is operating, are removably mounted on brackets adjustably mounted on the press frame.

The dismounting of the pneumatic dampening roller D, a positively-driven moisture-distributing brass roller G having rolling engagement therewith, and a molleton-covered water-diffusion and water reservoir roller M riding on the brass roller G, is indicated in Figure 7; as also, certain frame brackets 48 in which these rollers are mounted during the operation of the press 4.

Referring particularly to Figures 13 and 14, a chain 1 engaging a sprocket 82 secured to a shaft 80 driven from a main drive, of which main drive engaging gears 83 and 84 only are shown, also engages a sprocket 2 secured to a shaft 3 to which is also secured a gear 9 meshing with a gear 10 secured to a shaft g for the brass roller G. The gear 84 is secured to the shaft (not shown) for the press plate cylinder B, Figure 1. The gear 9 also engages a gear 11 secured to a stub shaft 12 to which shaft 12 is also secured a sprocket 8 engaged by a chain 14 which also engages a sprocket 13 secured to a shaft 17 for the water-feed roller K. The stub shaft 12 is mounted in a bracket 96 projected forwardly from and secured to the frame member F. The gear 11 is moved rearwardly off the gear 9 during the pivotal movement on a transverse rod 36, Figure 14, to inoperative position of the frame members E and F and related elements, as hereinafter fully explained.

A press blanket cylinder H which has rolling surface contact with the plate cylinder B is driven through gearing (not shown), Figure 1, this blanket cylinder H in turn having rolling contact with a press impression or printing cylinder J which also is suitably driven by means not shown. The several directions of rotation of the cylinders, spools, and rollers B, H, D, M, L, 5, G, J, and K are clearly shown in Figures 1, 3, 4, 5, 8, 11, and 14.

The water feed roller K has rolling contact with a roller 5 partially immersed in water contained in the pan 6 of the moisture fountain C and is supported by hook-like inclined hangers 5² secured at their upper ends to the inside face of the water pan 6 and forming a mounting for a roller shaft 5¹. The water pan 6 is pivotally mounted upon a rod 7, Figures 1, 2, 3, 4, 5, 6, 8, 11, and 14, secured at its ends in the pivotally-mounted frame members E and F. The water feed roller K is comprised of a plurality of spaced cylindrical elements k, Figure 2, from which moisture is fed to a plurality of spaced molleton-covered pivotally-mounted wheels or spools L, Figures 1, 2, 3, 4, 5, 8, 9, 11, and 14, whenever the pivotal position of the wheels L is such that they have rolling contact with the water feed roller K. The face dimension of each segment k of the water feed roller K is considerably less than the face dimension of each of the wheels L so that a plurality of the water feed roller segments k feed water to each of the wheels L. Spacing of the adjacent segments k of the water feed roller K one from the other provides means for efficient feeding of water from the tank roller 5 to the wheels L, the spaces between the segments k serving to carry the water from the water pan 6.

The wheels L are spaced one from the other and not connected together so that they have independent pivotal movement, i. e., each one moves pivotally according to the amount of moisture present in its molleton cover, the critical weight of moisture producing a pivotal movement of the wheel L having been determined according to the requirements of the particular part of the plate b served by any one or more of the wheels L, and this critical water weight utilized properly to set a threaded counterweight 25 hereinafter fully described. These wheels L, when in a water-dispensing position, have rolling contact with the brass roller G which in turn has rolling contact with the improved molleton-surfaced and pneumatic dampening roller D. Lying adjacently above the brass roller G and resting thereon so as to roll therewith is a diffusion roller M which also receives moisture from the brass roller G and returns it to the latter in a longitudinally-diffused condition whereby it is imparted from the brass roller G to the dampening roller D in such condition. This diffusion roller M assists in distributing the water in that it diffuses the surplus water so that too much is not fed into plate areas designed to produce a solid print. The diffusion roller M also acts as a water reservoir feeding moisture to the several sections of the dampening roller D through the medium of the brass roller G even when the wheel L or wheels L are in their upper non-dispensing and water-acquiring position.

Figure 6:
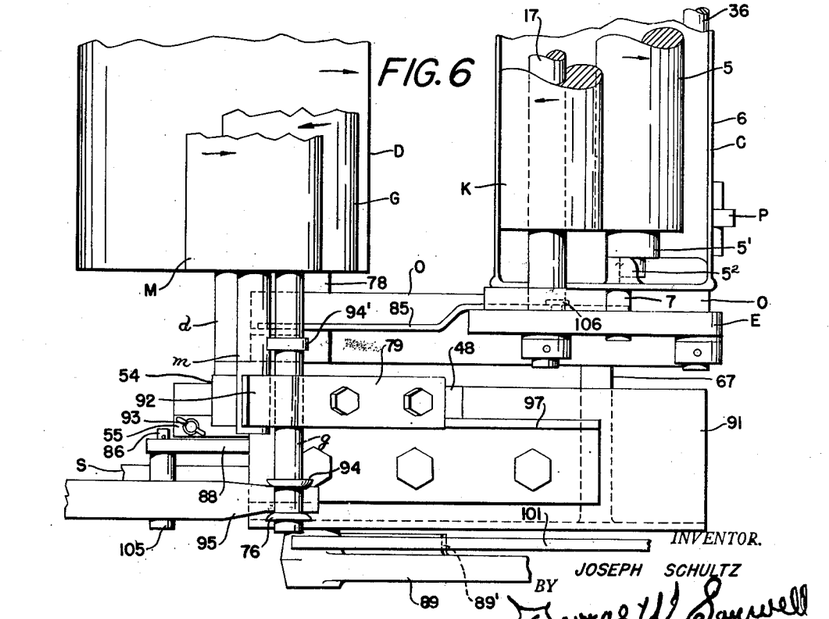
Figure 6 is a fragmentary transverse plan, upon an enlarged scale, of the operator's side of the press, the view being taken from the plane indicated by the line 6—6, Figure 1.

As an aid to the water-diffusing operation, the brass roller G has a manually-induced reciprocating shifting movement in the direction of its axis induced by mechanism hereinafter fully described and which most clearly appears in Figures 2, 6, and 7. Thus the areas of the dampening roller D which are fed water from adjacent wheels L overlap and thus insure uniform water supply to all parts of any given area of the plate b of the plate cylinder B. During this shifting of the brass roller G, the teeth of the gear 10, Figure 14, slide on the teeth of the gear 9, the stub shafts m of the roller M, Figure 7, sliding in slots 81 of the forked ends 92 of plates 79 mounted on the top surfaces of upright side brackets 48, and the shaft g of the brass roller G sliding between its collars 94 and 94¹ in slots 53¹ formed in blocks 53 secured to the outside faces of the brackets 48. The shifting means for the brass roller G are suggested by operating lever 95, Figures 2 and 6, secured to the shaft g between the collar 94 and an outer terminal collar 76 secured to the shaft g. These shifting means provide for an application of the water to the dampening roller D in overlapping areas and thus aid in diffusing the water and uniformly spreading it.

The pivoted wheels L are each rotatably mounted in the ends of the arms of a yoke 18 which some distance from its opposite end is pivotally mounted on a cross bar N, Figures 2, 3, 4, 5, 8, and 9, which is supported at its ends in the frame members E and F. The upper supporting edge of the cross bar N is wedge-shaped in cross-section and is engaged in inverted V-slots 18¹ formed in the bottom edge of opposed side flanges 22, Figure 9, of the yoke 18, these opposed yoke arms being rigidly secured together at their opposite ends by a plate 19, Figure 9, which completes the yoke formation, the plates 19 having a rear flange 20, a front flange 21, and shallow side flanges 22. The rear flange 20 carries a block 23 intersected by an elongated pin 24, the block 23 depending from the side flanges 22. The elongated pin 24 intersects the flange 20 and said block 23 and the cross bar N and is supported at one end in the front plate flange 21. The pin 24 has a screw-threaded rear end portion extended through the block 23 and the rear flange 20 and is engaged at its rear end by internally-threaded weights 25. The threaded portions of the elongated pin 24 adjacently forward of the flange 20 and adjacently rearward of the block 23 are engaged by clamping nuts 26.

The wheels L teeter upwardly and downwardly on the pivotal support N according to the relative weights of the elements on the respective sides of the pivotal axis, including the weight of the water in the molleton coverings of the wheels L which are rotatably mounted in the front ends of the yokes 18. Thus, the wheels L and their mountings serve as balance-like structures in the manner of scale devices for automatically controlling the direction of pivotal movements of the wheels L for either moisture pick-up or moisture dispensing, dependent upon the amounts of moisture content in the respective wheels L. For purposes of illustration, it may be stated that practical dimensions for the wheels L are four inches O. D. with an inch and a quarter face and that the amount of water held by the molleton cover of each wheel L when the wheel L will swing or stay downwardly on its pivotal axis is about 1¼ ounces. The definite amount of water on the wheel L which shall determine whether the wheel will assume its lower position or its upper position, in other words, whether it shall dispense water to the brass roller G or receive water from the water feed roller K, can be varied by movement of the weights 25 on the rear end of the elongated threaded pin 24.

Amongst the objects of the invention there has been hereinbefore mentioned a flat spring locking device that will periodically temporarily hold the pivoted wheel L in either "feed" or "off" position. This is for the purpose that the continued take-up of water or dispensing thereof during a short holding period shall insure a positive pivotal movement of the wheel L when the holding means are removed, if the relative moments on the two sides of the pivotal axis dictate a movement at that time. The structure and operation of such spring locking device will now be described.

Figures 11, 12, 12A:
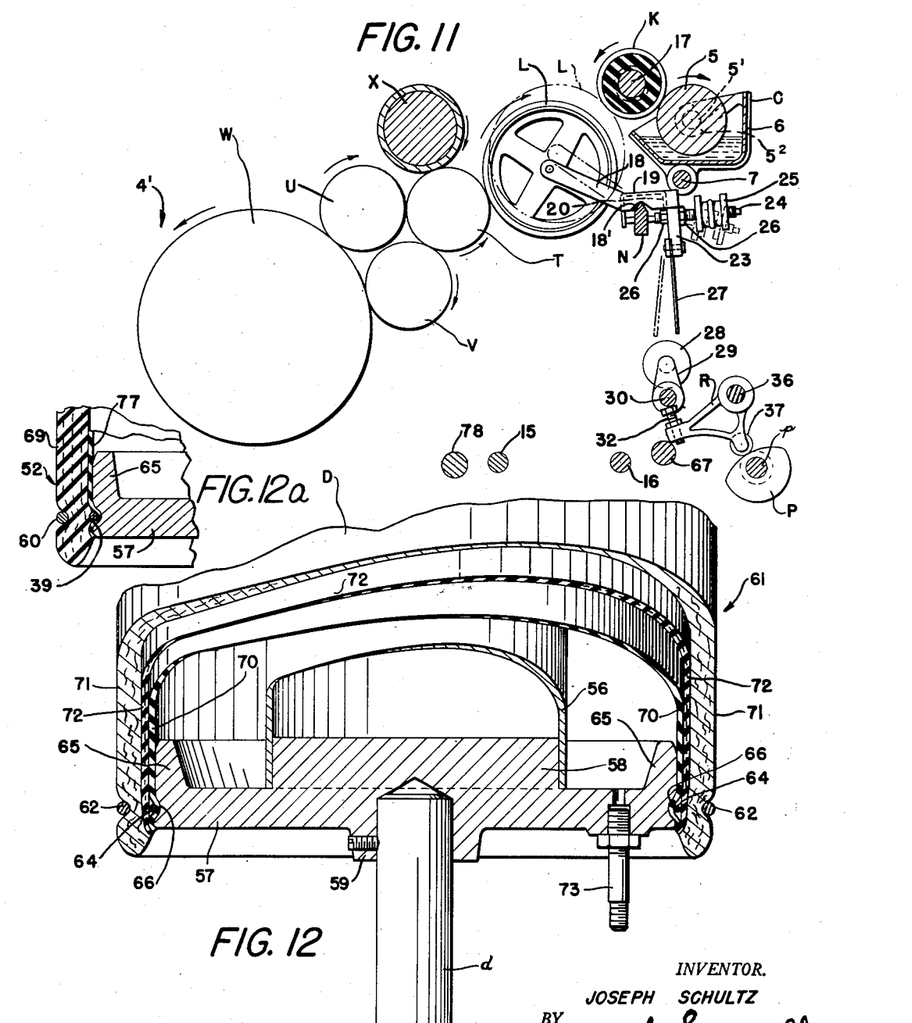
Figure 11 is a view, similar to Figure 5, showing an application of the improved dampening mechanism to a standard lithographic offset press equipped with the well-known water-feed brass roller and the two molleton-covered rollers having rolling engagement with the brass roller and with the plate cylinder.
Figure 12 is a transverse section, upon an enlarged scale, of an end portion of the improved pneumatic dampening roller forming part of the invention shown and described, the view being taken in the plane indicated by the line 12—12, Figure 3.
Figure 12a is a fragmentary transverse section of a modified formation for the outer layer of the improved pneumatic dampening roller.

The pivotal movement of the wheel L on the pivot bar N will not take place unless a spring plate 27 is in a neutral freely depending position shown in Figures 5 and 11. This spring plate 27 depends from the lower end of the block 23 and is adapted to be engaged by a vertically-movable disk 28 mounted off-center from the vertical plane containing the pivotal axis of the cross bar N between the upper ends of the two vertically-extending arms of a yoke 29 secured at its lower end by a set screw 31, Figure 2, to a cross shaft 30 which, in a manner hereinafter fully described, is periodically lifted to cause the disks 28 to engage the lower ends of the depending spring plates 27 to hold the latter in a forwardly-inclined position or a rearwardly-inclined position, as shown in Figures 3 and 4, respectively, depending upon whether the wheel L is in its water take-up position engaging the water feed roller K or is in its water-dispensing position engaging the brass roller G when the cross shaft 30 is lifted.

It is evident that when the depending plate 27 is free of the disk 28, the wheel L will assume or maintain a position on its pivotal supporting bar N according to the amount of moisture held by its molleton covering. If the wheel L has theretofore been dispensing water to the brass roller G and, at the time of the lowering of the disk 28, has dispensed such amount of water to the brass roller G as renders the wheel L too light to retain its lower water-dispensing position, then the weight 25 will swing the wheel structure on the cross bar N so that the wheel L engages the aligned segments $k$ of the water feed roller K and takes on more water. When the disk 28 is again lifted by the shaft 30, the wheel L will be held in this water take-up position as long as the depending plate 27 is held in the position shown in Figure 3. However, if when the wheel L is free to pivot on the bar N by reason of the free position of the spring plate 27, the wheel L holds moisture of an amount sufficient to cause it to pivot downwardly on the bar N, or to remain in its lower position, it will so pivot downwardly, or so remain in its lower position, when the depending plate 27 is released from the disk 28, and will stay in this water-dispensing position until it is lighter than its weighted end 25 and until the spring plate 27 is again released from the disk 28.

The holding disks 28 also act to prevent any undue pivoting on the support N due to the vibrations of the press.

The cross shaft 30 is welded at its ends to the lower ends of elongated rods 34, Figures 1 and 2, which extend upwardly from the shaft 30 and play vertically in brackets 33 which are secured to and extended inwardly of the frame members E and F. The shaft 30 is engaged at its lower side by adjustable screws 32 which are mounted in forward joints of rear side brackets R of triangular formation, Figures 2, 3, 4, and 5, which are pivotally mounted at their upper rear outer hub joints on a rod 36 secured at its ends in upwardly-directed rear end portions 49 of elongated longitudinal brackets O, Figures 15, 16, and 17, hereinafter fully described. The elongated brackets O are also formed with depending front and rear end portions 51 and 50, respectively, of which 50 forms a mounting for a cam shaft $p$ and a cross bar 67, and 51 forms a mounting for a handle-actuated shaft 78. A third lower rear joint of each bracket R carries a pivotally mounted roller 37 which is engaged by a cam P secured to and adjacent an end of the shaft $p$, Figures 1, 2, 3, 4, 5, 11, 13, 14, 15, and 16. The cam shaft $p$ is driven by a belt 41 actuated from the press drive (not shown) and engaging a pulley 40 secured to the cam shaft $p$, Figures 13 and 14. The cam shaft $p$ on the operator's side of the press 4 is mounted in the depending portion 50 of the bracket O, and on the driving side of the press 4 is an outboard bearing 74. When the rotatable position of the cams P permit the brackets R to swing on the shaft 36 to the lowermost position of the adjustable screws 32, the forward joints of the brackets R rest on the cross bar 67, Figures 5 and 11. The cross bar 67 is mounted in and adjacent one end of the longitudinal exterior angle plates 91, Figures 1, 2, 6, 7, 13, 14, 15, and 17, which are bolted to superposed filler plates 98 which in turn are bolted to superposed angle plates 97. The upright brackets 48 are bolted to the angle plates 97, Figure 7. The opposite ends of the angle plates 91 are mounted on the shaft 78 provided with an operating handle 89, Figures 2, 6, 15, and 17, hereinafter more fully described.

Figure 8:
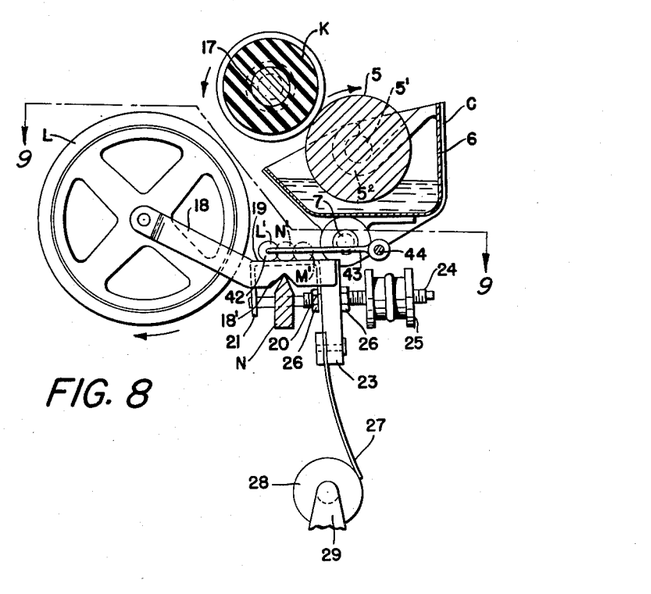
Figure 9:
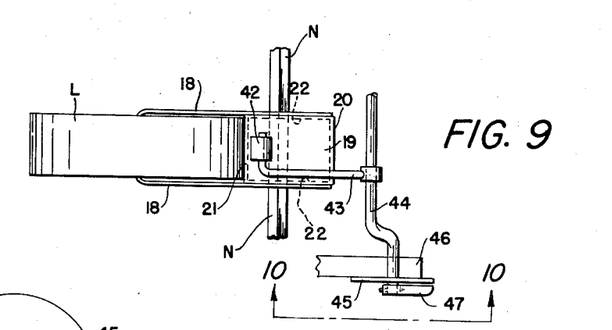
Figure 9 is a fragmentary longitudinal plan view, taken from the planes indicated by the line 9—9, Figure 8.
Figure 10:
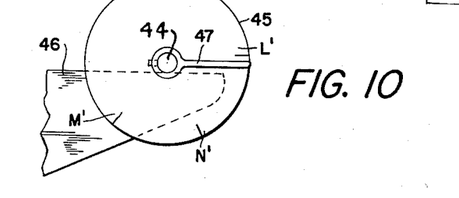
Figure 10 is a longitudinal elevation of certain features of the fine control shown in Figures 8 and 9, the view being upon an enlarged scale and particularly showing the indicia upon a dial which indicate the required relative positions of a pivoted control finger for feeding a lesser amount, or a normal amount, or a greater amount of water toward the plate.

There is also provided a fine adjustment determining the amount of moisture to be carried by the respective wheels L and controlling the upward and downward movements thereof into water-receiving and water-dispensing positions. This fine adjustment is illustrated in Figures 8, 9, and 10, and is particularly serviceable for providing proper water treatment for various kinds of paper. A hard coated paper being printed requires a comparatively smaller amount of water and ink for best printing results than a soft paper, for instance blotting paper, which is very absorbent. This fine adjustment is obtained by a roller 42 for each wheel L positioned substantially adjacently above the pivotal axis of the wheel L and mounted on an angular end of a rod 43 whose other end is pivotally mounted on a crank arm 44 pivotally mounted at one end in the under frame of the pan 6. Actuation of the crank arm 44 causes the roller 42 to ride forwardly and rearwardly on the surface of the plate 19 thus to regulate the amount of moisture which will determine whether the wheel L will swing upwardly or downwardly when it is free to swing. This adjustment provides a fine overall control of the moisture carried by all the wheels L.

It will be noted in Figure 8 that if the roller 42 is in its left-hand full line position, the moment on the wheel side of the pivotal mounting on the bar N will be increased and less water will be required to swing the wheel L into water-dispensing position; that if the roller 42 is aligned in neutral position with the pivotal mounting, normal conditions, shown in Figures 3, 4, 5, and 8, will obtain; and that if the roller 42 is on the weight side of the pivotal mounting, more water will be required to swing the wheel L into a water-dispensing position. This adjustment of the roller 42 is gaged by a dial 45, which is secured to a frame bracket 46 and is intersected by the crank end of the crank 44 and over which plays a pointer 47 secured to the crank and the position of which on the dial 45 determines whether the crank has been turned to place the roller 42 in a comparatively slight water pick-up position, a neutral position, or a comparatively heavy water pick-up position. The three dial readings, viz., "$L^1$," a less amount of water; "$N^1$," a neutral amount of water; and "$M^1$," more water, Figures 8 and 10, are illustrative of the varied amounts of water pick-up obtainable by the adjustment of the pointer 47 over the dial 45.

It has been hereinbefore stated that the dampening roller D, the brass roller G, and the diffusion roller M, Figure 7, are removably mounted on the brackets 48. These brackets 48 are secured to the brackets 91 which are slidably mounted on longitudinal side rods S and $S^1$, Figures 6, 13, 14, 15, and 17. The outer ends of these rods S and $S^1$ are secured to the frame of the press 4 and the rods are provided with fixed collars 105, Figures 15 and 17, from the inner sides of which project transverse pins 86 upon which are pivotally mounted one end of links 88 whose other ends are pivotally mounted upon pins 87 projected transversely upwardly from collars 90 secured to the manually-actuable cross shaft 78. The operating handle 89 is secured to the outer end of the shaft 78 on the operator's side of the press.

Pivotally secured at one of their ends to the brackets O, Figures 1, 6, 15, 16, and 17, by angles 75 and pins 99, are upwardly inclined links 85 which are formed at their upper ends with slots 100 through which play pins 106 secured to and inwardly projected from the frame members E and F. When the mechanism is moved by upward actuation of the handle 89, as hereinafter explained, the links 85 engage these pins 106 and the dampening rollers D, spools L, and the frame members E and F, and all the associated elements slide rearwardly of the press upon the rods S and $S^1$. However, when the frame members E and F are pulled rearwardly by hand upon the rod 36 as a pivotal axis, which is done after the aforesaid sliding movement, only the frame members E and F and the elements associated with them move rearwardly since the pins 106 travel upwardly in the slots 100 of the links 85, Figure 1, to the upper end of these slots 100, the walls of which upper slot ends form stops limiting the movement of the pins 106, and, hence, the pivotal movement of the frame members E and F and the elements partaking of their hand-operated pivotal movement.

The detailed operations by which this initial sliding movement of the entire dampening mechanism, and the final pivotal movement of the frame members E and F and associated elements are effected, will be hereinafter fully described, it being here merely noted that the left-hand dot-and-dash position, Figure 1, shows certain of the elements at the end of their sliding movement, and the right-hand dot-and-dash position of Figure 1 shows the final position of certain elements at the end of the pivotal movement.

Figures 15, 16, 17:
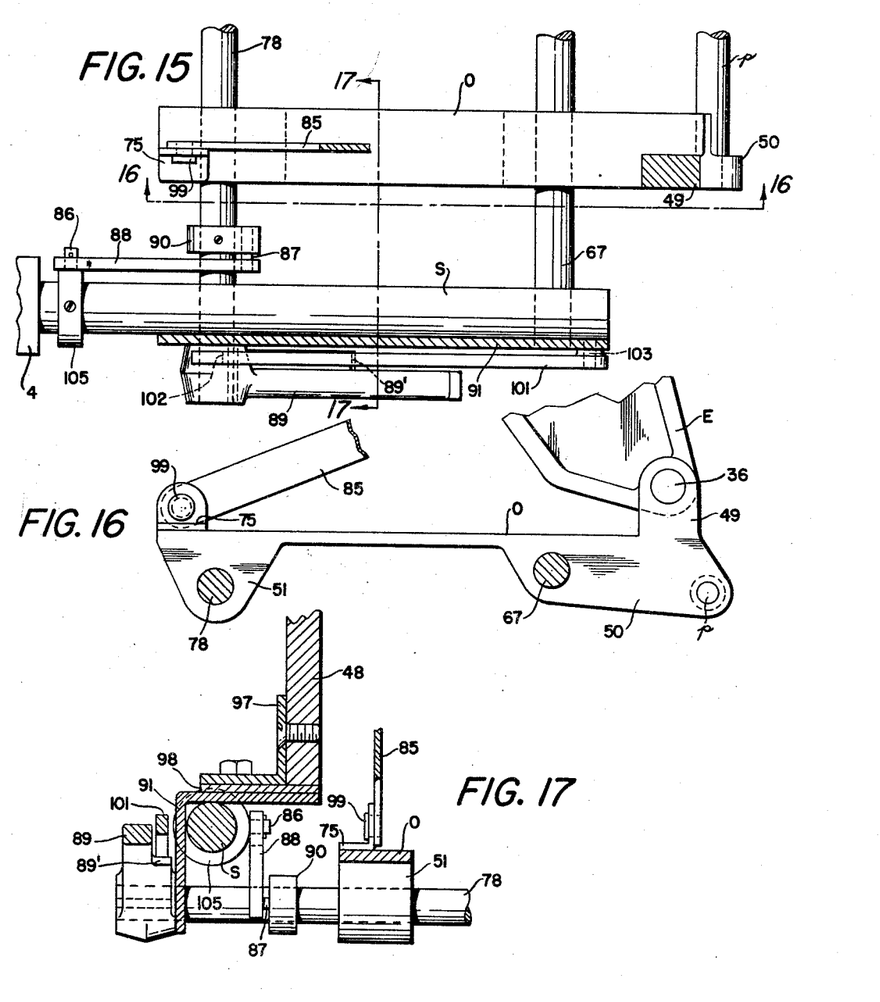
Figure 15 is a fragmentary plan of certain manual controls on the operator's side of the press for shifting the dampening mechanism, the view being upon an enlarged scale and taken from the planes indicated by the line 15—15, Figure 1.
Figure 16 is a fragmentary longitudinal vertical section, taken in the plane indicated by the line 16—16, Figure 15.
Figure 17 is a fragmentary vertical transverse section, taken in the planes indicated by the line 17—17, Figures 1 and 15, the section being upon the same scale as Figure 15, and upon a larger scale than Figure 1.

Referring particularly to Figures 1, 2, 6, 15, 16, and 17, it is evident that a lifting of the handle 89 upwardly from the position shown therefor in Figures 1 and 15 will turn the shaft 78 and the collar 90. However, since the collars 105 are fixed on the longitudinal base rods S and S¹, the links 88 can only turn pivotally at their ends on the pins 86 and 87, respectively, so that the whole structure to which the uprights 48 are secured is slid rearwardly on the base rods S and S¹ to the position shown in the left-hand dot-and-dash position appearing in Figure 1. The handle 89 is notched, as indicated by 89¹, Figures 15 and 17, and this notch 89¹ is engageable with a shoulder 102 formed on and adjacent the outer end of a bar 101 pivoted at its opposite end on the outer face of the angle plate 91 by a pin 103. When the handle has been lifted sufficiently to produce the desired rearward sliding movement of the mentioned elements, an engagement of the notched part of the handle 89 with the pivoted bar 101 prevents the handle 89 from falling back into position therefor shown in Figure 15. When it is desired to slide the elements forwardly again into their operative position, the bar 101 is manually lifted to release the notched portion 89¹ of the handle 89 from the stop shoulder 102 of the bar 101.

As hereinbefore mentioned, the shafts $g$ and $m$ for the brass roller G and the diffusion roller M, respectively, Figure 7, are removably mounted in plates 79 and blocks 53 secured to the upright brackets 48. Also, the stub shafts $d$ of the dampening roller D are removably mounted in slot 54¹ of blocks 54 secured to the brackets 48. Pivoted keepers 55 and 63 are provided for holding the stub shafts $d$ and $g$ of the dampening rolling D and the brass roller G, respectively, in the respective slots 54¹ and 53¹, these keepers having thumb screws 93 and 104, respectively, engaging therewith for firmly holding the keepers in locked position or for releasing them for pivotal movement whereby the respective rollers D and G can be removed. Figure 1 shows the rollers M, G, and D in mounted position, and Figure 7 shows them removed from their mountings.

These rollers D, G, and M are removed for various reasons, such as obtaining access to the parts of the press beneath them, replacing the molleton covers of the diffusion roller M and the dampening roller D, etc.

The final movement of certain elements to an inoperative position is indicated by the right-hand dot-and-dash position of Figure 1. This is a pivotal movement upon the rod 36 and involves the frame members E and F and the associated elements such as the pivoted spools L, the water feed roller K, the water tank 6, and the chain 14 and its associated sprockets. This pivotal movement also involves the gear 11 which is pulled away from its engaging gear 9. This movement is a manually-actuated one and consists simply in pulling these elements rearwardly on the pivotal axis 36. During this pivotal movement the chain 14 is permitted to sag.

The dampening roller D is of special construction providing for rolling engagement therewith of the brass roller G and the plate cylinder B against pneumatic pressure. The core of the dampening roller D, Figure 12, is a metal tube 56, for instance, aluminum, a tube of 3" O. D., which is closed at its ends by caps 57 which are castings and have inwardly extended blocks 58 which snugly fit within the tube 56. The caps 57 have also each an exterior boss 59 within which fits the ends of the stub shafts $d$. Surrounding the tube 56 and snugly engaging exterior flanges 65 of the caps 57, is a molleton composite sleeve 61, for instance, a sleeve of 6" O. D., thus providing a 1½" air space completely around the tube 56. The outside diameter of the flanges 65 is 5¼", for the illustrated size stated, and their exterior surfaces are formed with grooves 66. The ends of the sleeve 61 overlie these grooves 66 and the inner layer 70 of the sleeve 61, hereinafter described, is tightly retained therein by wires 64 which tightly engage the grooves 66.

The composition of the sleeve 61 is an inner layer 70 of pure gum of about ⅟₁₆" thickness which will inflate at about 2 lbs. pressure. The sleeve 61 also has an outer layer 71 of water-absorbing molleton which is about ¼" thick. Between these inner and outer sleeve layers is a layer 72 comprised of rubber and interspersed cloth so that this intermediate layer will not expand. This intermediate layer 72 is also about ⅟₁₆" thick. Intersecting the sleeve 61 is an air valve 73 communicating with the space between the tube core 56 and the outer sleeve 61. A cord 62 is removably bound about the composite structure 71—72.

The rubber and cloth layer 72 of the sleeve 61 has been described, and is shown in Figure 12, as a layer distinct from the outer molleton layer 71, these being layers which are retained on the caps 57 by the removable cord 62. However, this removable outside covering of the sleeve 61 may consist of suitably flexible tubing 69, Figure 12a, which has the requisite absorbent molleton outer part and incorporated therewith a cloth constituent which will maintain the proper circumference of this removable outer portion of a sleeve 52. The removable cord for retaining the outer layer 69 is indicated by "60," the wire cord secured around the inner pure rubber layer 77 is indicated by "39," and the entire covering of Figure 12a is indicated by the number "52."

It is evident from the aforegoing description that, when the entire dampening mechanism rearwardly of the plate cylinder B is slid rearwardly, and then the frame members E and F and their associated elements are further pulled rearwardly upon the pivotal axis 36, the water diffusion roller M, the brass roller G, and the dampening roller D can be removed from their mountings, as shown in Figure 7. This permits such repair on or replacement of these rollers as is desired and, as regards the dampening roller D, permits the removal of the sleeve parts 71—72 or the rubber tubing 69 thereof by an unfastening of the cords 62 or the cords 60 and a deflation by the air valve 73 of the inner sleeve part 70 or the inner sleeve part 77. When the desired replacements have been made, the sleeve parts 71 and 72 or the rubber tubing 69 can be again secured by the cords 62 or the cords 60 on the caps 57 and the sleeve part 70 or the sleeve part 77 inflated to provide the desired rolling pneumatic pressure on the brass roller G and the plate cylinder B, a pressure which is obtained by the use of about 2 lbs. of air.

Figure 11 illustrates the application of the improved counterweighted water-supplying spools or wheels L and associated elements to a standard press 4¹ having a brass roller T in rolling contact with two molleton-covered rollers U and V which engage a plate cylinder W. Riding upon the brass roller T is the diffusion or water reservoir roller X. The action of the pivoted wheels L for reception of water from the water feed roller K and application of water to the brass roller T whence it is transferred to the molleton-covered rollers U and V and finally to the plate cylinder W, is the same as that previously described for the action thereof in Figures 3, 4, and 5 wherein the dampening roller D is shown.

From the aforegoing description and the annexed drawings, it is apparent that the adjustable counterweight 25 of each wheel L may set so that its wheel will take on and dispense moisture according to the amount of moisture best serving the part of the plate $b$ to which moisture is supplied by that particular wheel L. It is further evident that the moment of the wheel L and the moisture present thereon can be varied according to the requirements of the particular plate area served by the wheel by adjusting the weight 25 on the threaded pin 24.

It is further evident that the moment of the entire set of wheels L and the moisture present on them can be varied for the particular kind of paper upon which the impression is being made by an adjustment of the fine scale control shown in Figures 8, 9, and 10. This adjustment is an overall control and will apply to all the wheels L, although each individual wheel L has its own setting by reason of the counterweights 25.

In addition to the moisture feed to each area of the plate cylinder B, according to its requirement, obtained by the individual setting of the weight 25 for its particular wheel L, uniform gradually merging edges of water feed for adjacent plate areas are obtained by the roller M which diffuses the moisture over the surface of the brass roller G and which also acts as a water reservoir so as to continue to furnish water to the brass roller G even when the wheel L is not in rolling engagement with the brass roller G.

It is also evident that the outer covering of the dampening roller D is readily removable for repair or replacement, and that this removability is further made easy by the pneumatic nature of the sleeve for the dampening roller D. It is particularly advantageous to have a dampening roller which needs no setting. This is true of the improved dampening roller D herein shown and described, its pneumatic nature adapting it very efficiently for its rolling engagement with the brass roller G and the plate cylinder B, as is clearly shown in Figures 3, 4, and 5.

Furthermore, the dampening mechanism as a whole can be slid on the press frame rearwardly toward the feed end of the press through the medium of the manually-actuated control lever 89 and its associated elements, and then the water transfer wheels L, the water-feed roller K, and the water tank C, and associated elements supported by the frame members E and F further pulled forwardly upon the pivotal axis 36. These movements will permit removal of the water reservoir roller M and the positively driven brass roller G, and will also make the dampening roller D accessible for removal. These rollers M, G, and D, particularly the dampening roller D, can be serviced or replaced, as is desirable.

What I claim is:

1. Mechanism for moistening rollers of lithographic presses, for use between moisture supply means and a dampening roller spaced from the moisture supply means, comprising a moisture-receptive and moisture-dispensing member, and teeter means mounting said member on an axis for up and down pivotal movements on the axis toward and from the moisture supply means and said dampening roller, the member with its moisture content being disposed on the mounting means on one side of the axis and the mounting means being counterbalanced on the opposite side of said axis thereby to form a balance-like structure automatically controlling, according to the amount of moisture content in the member, the direction of pivotal movement of the member either for moisture pick-up or moisture dispensing.

2. Mechanism for moistening rollers of lithographic presses, characterized as in claim 1, in which a hard-surfaced roller is interposed between the pivotal member and the dampening roller, by means of which hard-surfaced roller the moisture is supplied to the dampening roller, in which means are provided for positively driving the hard-surfaced roller, and in which the latter receives moisture from the member when the latter assumes moisture-dispensing position.

3. Mechanism for moistening rollers of lithographic presses, characterized as in claim 1, in which means are provided for temporarily holding the member in moisture pick-up and moisture-dispensing positions, which means comprise a spring plate depending from the mounting means, a disk mounted adjacent the lower end of the plate, and means periodically moving the disk into and out of the path of plate movement created by the plate swing during the pivotal movements of the member.

4. Mechanism for moistening rollers of lithographic presses, characterized as in claim 1, in which there are a plurality of laterally-spaced moisture-receptive and moisture-dispensing members for a single dampening roller, in which the members are mounted for independent pivotal movements, and in which the members are individually and selectively counterbalanced for the automatic control of the several members effecting their respective movements from moisture pick-up position, to moisture-dispensing position, or vice versa.

5. Mechanism for moistening rollers of lithographic presses, characterized as in claim 1, in which means are provided for varying the moment of the member and its moisture content on its pivotal mounting relative to the moment of the counterbalancing side of the mounting means.

6. Mechanism for moistening rollers of lithographic presses, characterized as in claim 1, in which means are provided for periodically temporarily retaining the member in moisture pick-up and moisture-dispensing positions irrespective of a shift in moment.

7. Mechanism for moistening rollers of lithographic presses, characterized as in claim 1, in which means are provided inducing a retarded change of direction of pivotal movement of the member, from moisture pick-up position toward moisture-dispensing position, or vice versa, whereby a positive directional moment of the mounting means obtains.

8. Mechanism for moistening rollers of lithographic presses, characterized as in claim 6, in which the retaining means comprise a spring plate depending from the mounting means, and means periodically engaging the spring plate to hold it and, hence, the member in either pick-up or dispensing position.

9. Mechanism for moistening rollers of lithographic presses, characterized as in claim 8, in which the spring plate depends from the counter-balanced side of the mounting means.

10. Mechanism for moistening rollers of lithographic presses, characterized as in claim 1, in which the mounting means include a yoke pivotally mounted intermediate its ends, in which the member is mounted in and adjacent one end of the yoke, and in which a counterbalance is mounted on and adjacent the opposite end of the yoke.

11. Mechanism for moistening rollers of lithographic presses, characterized as in claim 1, in which the member is a spool having a peripheral moisture pick-up and moisture-dispensing portion, which spool is rotatably carried by the mounting means.

12. Mechanism for moistening rollers of lithographic presses, characterized as in claim 5, in which the member is a spool having a peripheral moisture pick-up and moisture-dispensing portion, which spool is rotatably carried by the mounting means.

13. Mechanism for moistening rollers of lithographic presses, characterized as in claim 1, in which a hard-surfaced roller is interposed between the pivotal member and the dampening roller, to which hard-surfaced roller the moisture is supplied by the pivotal member when the latter assumes moisture-dispensing position, from which hard-surfaced roller the moisture is supplied to the dampening roller, in which a moisture-diffusing member rides upon the hard-surfaced roller, and in which means are provided for positively driving the hard-surfaced roller.

14. Mechanism for moistening rollers of lithographic presses, characterized as in claim 5, in which the varying means include a scale device indicating the moment of the member and its moisture content on one side of the pivotal axis as compared with the moment of the counter-balancing structure on the opposite side of the pivotal axis.

15. Mechanism for moistening rollers of lithographic presses, characterized as in claim 1, in which there are a plurality of independent moisture-receptive and moisture-dispensing members pivotally mounted on a common axis, and in which the weights of the several members and their moisture contents are individually counter-balanced.

16. Mechanism for moistening rollers of lithographic presses, characterized as in claim 1, in which there are a plurality of independent moisture-receptive and moisture-dispensing members pivotally mounted on a common axis, and in which the weights of the several members and their moisture contents are respectively and individually selectively counterbalanced, and in which means are provided for varying the moment of all the members and their water contents as a unit relative to the moment of the counterbalanced sides of the mounting means.

17. Mechanism for moistening rollers of lithographic presses, characterized as in claim 16, in which the varying means include a scale device indicating the moment of the members and their moisture contents on one side of the pivotal axis as compared with the moment of the counterbalancing structures on the opposite side of the pivotal axis.

18. Mechanism for moistening rollers of lithographic presses, characterized as in claim 16, in which the varying means include a scale device having a dial, a pointer manually actuable about the dial, in which a rolling weight for each member is shiftable scross the axis by the dial pointer, and in which the scale indicates the moment of the members and their moisture contents on one side of the pivotal axis as compared with the moment of the counterbalancing structures on the opposite side of the pivotal axis.

19. Mechanism for moistening rollers of lithographic presses, characterized as in claim 2, in which means are provided for effecting longitudinal reciprocating movements of the hard-surfaced roller in a direction parallel to its axis.

20. Mechanism for moistening rollers of lithographic presses, characterized as in claim 1, in which a hard-surfaced roller is in continuous contact with the dampening roller and is interposed between the latter and the pivotal member and intermittently receives moisture from the latter, and in which a moisture-diffusing member rides upon the hard-surfaced roller.

21. Mechanism for moistening rollers of lithographic presses, characterized as in claim 3, in which means are provided upon which the disk is rotatable on an axis laterally of the vertical plane containing the pivotal axis of the member.

References Cited in the file of this patent

UNITED STATES PATENTS

| Number | Name | Date |
|---|---|---|
| 338,769 | Osborne | Mar. 30, 1886 |
| 742,249 | Spalckhaver | Oct. 27, 1903 |
| 1,683,243 | Blaine | Sept. 4, 1928 |
| 2,046,189 | Schultz | June 30, 1936 |
| 2,165,231 | Curtis | July 11, 1939 |
| 2,402,463 | Sullivan | June 18, 1946 |
| 2,443,458 | Janke | June 15, 1948 |
| 2,464,040 | Huebner | Mar. 8, 1949 |
| 2,518,221 | Camphouse | Aug. 8, 1950 |
| 2,580,667 | Faeber et al. | Jan. 1, 1952 |
| 2,622,519 | Keil | Dec. 23, 1952 |